(12) United States Patent
Gattei et al.

(10) Patent No.: US 10,830,430 B2
(45) Date of Patent: Nov. 10, 2020

(54) STEAM SYSTEM FOR A STEAM COOKING APPLIANCE

(71) Applicant: Electrolux Home Products Corporation N. V., Brussels (BE)

(72) Inventors: Lorenzo Gattei, Forli (IT); Paolo Faraldi, Forli (IT)

(73) Assignee: Electrolux Home Products, Corporation N.V., Brussels (BE)

( * ) Notice: Subject to any disclaimer, the term of this patent is extended or adjusted under 35 U.S.C. 154(b) by 932 days.

(21) Appl. No.: 14/417,675

(22) PCT Filed: Aug. 14, 2013

(86) PCT No.: PCT/EP2013/067003
§ 371 (c)(1),
(2) Date: Jan. 27, 2015

(87) PCT Pub. No.: WO2014/037198
PCT Pub. Date: Mar. 13, 2014

(65) Prior Publication Data
US 2015/0192289 A1    Jul. 9, 2015

(30) Foreign Application Priority Data
Sep. 10, 2012  (EP) .................................. 12183705

(51) Int. Cl.
*F22B 1/28*    (2006.01)
*F24C 15/32*   (2006.01)
(Continued)

(52) U.S. Cl.
CPC ............... *F22B 1/282* (2013.01); *A47J 27/04* (2013.01); *F24C 15/327* (2013.01); *A21B 3/04* (2013.01); *A47J 2027/043* (2013.01)

(58) Field of Classification Search
CPC ....... A21B 3/04; A47J 2027/043; A47J 27/04; F24C 15/32
See application file for complete search history.

(56) References Cited

U.S. PATENT DOCUMENTS 1,777,969 A * 10/1930 Grill ....................... A47J 27/17
126/343.5 A
1,959,377 A * 5/1934 Lucke ...................... F22B 1/06
126/378.1
(Continued)

FOREIGN PATENT DOCUMENTS

DE    102007048567    4/2009
EP         2650615    10/2013
(Continued)

OTHER PUBLICATIONS

International Search Report for PCT/EP2013/067003, dated Sep. 18, 2013, 2 pages.
(Continued)

*Primary Examiner* — Avinash A Savani
*Assistant Examiner* — Deepak A Deean
(74) *Attorney, Agent, or Firm* — Pearne & Gordon LLP

(57) ABSTRACT

The present invention relates to a steam system for a steam cooking appliance. The steam system includes a steam generator (12) and a precipitator (14). The precipitator (14) is arranged above the steam generator (12). The steam generator (12) comprises two vertical heating pipe sections (20; 34). Upper ends of the heating pipe sections (20; 34) are connected to a bottom side of the precipitator (14). Lower ends of the heating pipe sections (20; 34) are connected by a transverse pipe section (20; 36). At least the heating pipe sections (20; 34) are at least partially enclosed by one or more heating elements (22). An inlet pipe (28) is connected to the transverse pipe section (20; 36) at one end and connected or connectable to a water reservoir (16) or water (Continued)

Figure 1:
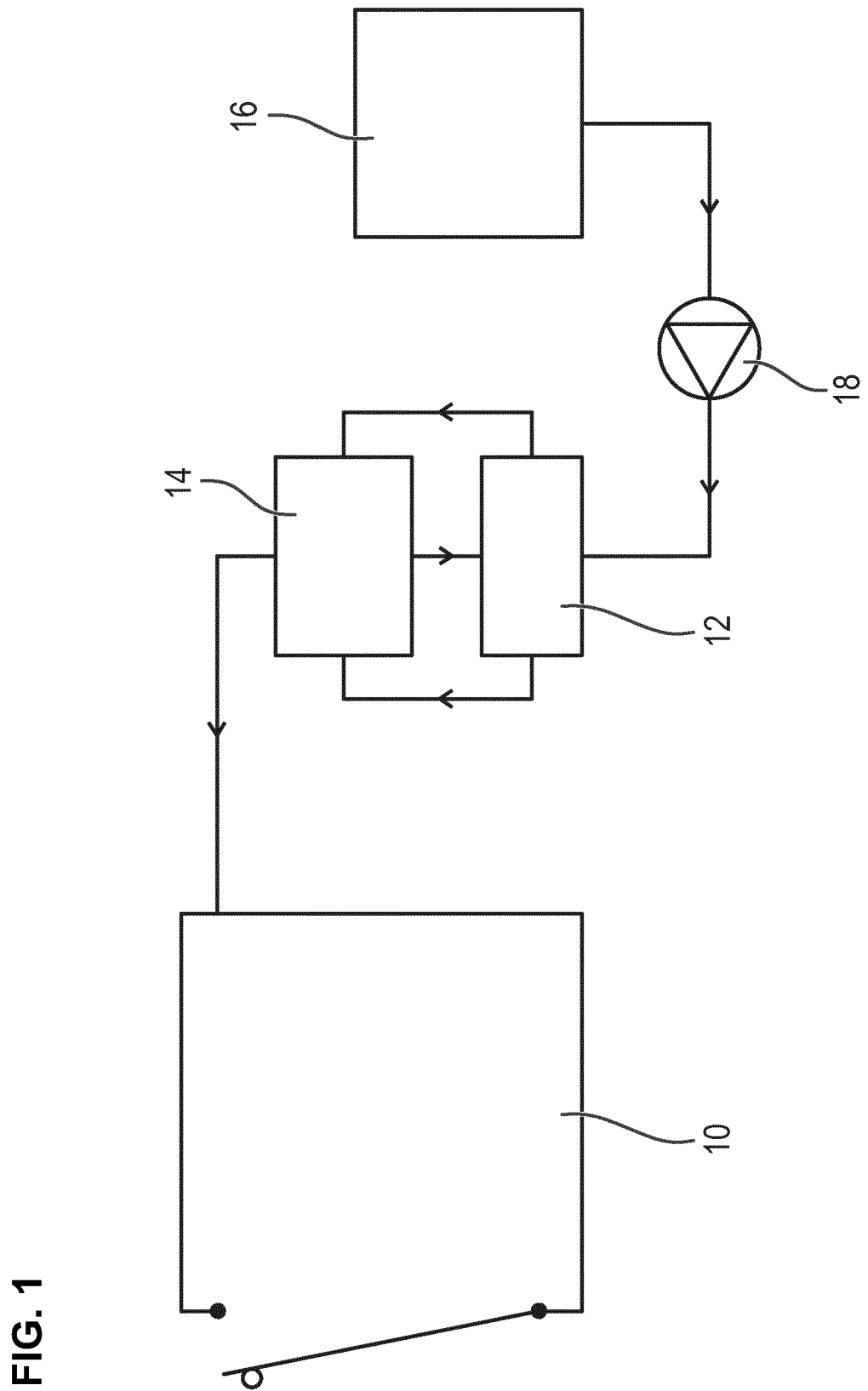

pump (18) at another end. A return pipe (24) is interconnected between the bottom side of the precipitator (14) and the transverse pipe section (20; 36). Further, the present invention relates to a corresponding steam cooking appliance.

19 Claims, 3 Drawing Sheets

(51) Int. Cl.
*A47J 27/04* (2006.01)
*A21B 3/04* (2006.01)

(56) References Cited

U.S. PATENT DOCUMENTS

| | | | | |
|---|---|---|---|---|
| 2,411,006 | A * | 11/1946 | Sharp | A47J 27/022 |
| | | | | 126/378.1 |
| 2,756,425 | A * | 7/1956 | Webber | A47J 27/16 |
| | | | | 126/378.1 |
| 3,103,206 | A * | 9/1963 | Halvorsen | F22B 1/1884 |
| | | | | 122/34 |
| 3,332,338 | A * | 7/1967 | Wein | A47J 27/18 |
| | | | | 126/378.1 |
| 4,660,542 | A * | 4/1987 | Scherer | A47J 27/17 |
| | | | | 126/348 |
| 5,527,516 | A * | 6/1996 | Yamamoto | A61L 2/04 |
| | | | | 159/4.08 |
| 5,840,248 | A * | 11/1998 | Ongaro | A61L 2/07 |
| | | | | 237/40 |
| 7,241,976 | B2 * | 7/2007 | Andoh | A21B 3/04 |
| | | | | 126/20 |
| 8,808,638 | B2 * | 8/2014 | Tomoda | A23L 3/10 |
| | | | | 392/394 |
| 2014/0034743 | A1 * | 2/2014 | Zhadanovsky | F01K 17/02 |
| | | | | 237/9 R |
| 2015/0335190 | A1 * | 11/2015 | Tomoda | A23L 3/10 |
| | | | | 99/447 |

FOREIGN PATENT DOCUMENTS

| | | |
|---|---|---|
| FR | 2678359 | 12/1992 |
| GB | 2377483 | 1/2003 |
| JP | 2013074879 A * | 4/2013 |
| WO | 2011117659 | 9/2011 |

OTHER PUBLICATIONS

Response to Office action dated Jun. 8, 2018 for co-pending U.S. Appl. No. 15/033,394 listing the current claims therein, owned by Electrolux Home Products Corporation N.V.

* cited by examiner

STEAM SYSTEM FOR A STEAM COOKING APPLIANCE

The present invention relates to a steam system for a steam cooking appliance. Further, the present invention relates to a corresponding steam cooking appliance.

A steam cooking appliance oven is a special kind of cooking appliance, wherein steam is delivered into the oven cavity in order to assist the cooking process. Steam is usually produced in a steam generator during the cooking cycle. The steam generator may be arranged inside or out of the oven cavity. In particular, an external steam generator produces steam outside the oven cavity and conveys said steam through a duct into the oven cavity.

There are several types of steam generators available on the market. Popular steam generators are heated pipes, since the costs are relative low and the use is flexible. Said heated pipes may be straight or bent in a U-shape. The U-shaped heated pipe allows a higher power density, since a relative high length of the heated pipe may be arranged within a small space. Water is usually provided either by gravity or by a pump.

A dry steam flow is very important for steam ovens. The steam flow should be free of water droplets. Said water droplets may stain the surface of the foodstuff. Water boiling by high power generates a steam flow carrying a considerable amount of water droplets. It would be advantageous to remove the water droplets from the steam. For example, there are two principles for removing the water droplets from the steam. According to a first principle the flow speed is reduced by an increased cross section. According to a second principle the water droplets are collected on impact surfaces forming a labyrinth path.

It is an object of the present invention to provide a steam system for a steam cooking appliance, wherein the steam system ensures a dry steam flow to the steam cooking appliance by low complexity.

The object of the present invention is achieved by the steam system for a steam cooking appliance according to claim 1.

The present invention relates to a steam system for a steam cooking appliance, wherein:
the steam system includes a steam generator and a precipitator,
the precipitator is arranged above the steam generator,
the steam generator comprises two vertical heating pipe sections,
upper ends of the heating pipe sections are connected to a bottom side of the precipitator,
lower ends of the heating pipe sections are connected by a transverse pipe section,
at least the heating pipe sections are at least partially enclosed by one or more heating elements,
an inlet pipe is connected to the transverse pipe section at one end and connected or connectable to a water reservoir or water pump at another end, and
a return pipe is interconnected between the bottom side of the precipitator and the transverse pipe section.

The main idea of the present invention is the use of the two vertical heating pipe sections, wherein the inlet pipe delivers water from the water reservoir or water pump to the transverse pipe section between the lower ends of the heating pipe sections. The both vertical heating pipe sections provide two exits from the steam generator to the precipitator. Said two exits reduce the amount of airborne water droplets from the beginning. Further, the precipitator allows the almost complete separation of the remaining water droplets.

Preferably, a one-way valve is interconnected between the bottom side of the precipitator and the return pipe. The one-way valve ensures that the water passes the vertical heating pipe sections.

Further, an outlet pipe is connected to a top side of the precipitator at one end and connected or connectable to an oven cavity at another end.

In particular, the precipitator is formed as housing and comprises a number of impacted surfaces inside said housing. The impacted surfaces hold back water droplets.

According to one embodiment of the present invention the steam generator comprises a U-shaped heating pipe, wherein open ends of said U-shaped heating pipe are connected to the bottom side of the precipitator and a lower bent portion of said U-shaped heating pipe form the transverse pipe section.

Preferably, the lower bent portion of the U-shaped heating pipe is at least partially enclosed by one or more heating elements.

In particular, the U-shaped heating pipe is completely enclosed by one or more heating elements.

Furthermore, the return pipe and the inlet pipe comprise a common pipe section connected to the lower bent portion of the U-shaped heating pipe.

For example, the one-way valve comprises a floating ball and a calibrated hole, wherein the floating ball acts on the calibrated hole.

The present invention relates to a steam cooking appliance including an oven cavity, a water reservoir and a steam system interconnected between the water reservoir and oven cavity, wherein the steam cooking appliance includes the steam system mentioned above.

At last, the steam cooking appliance includes a water pump interconnected between the water reservoir and the steam system.

Novel and inventive features of the present invention are set forth in the appended claims.

Figure 2:
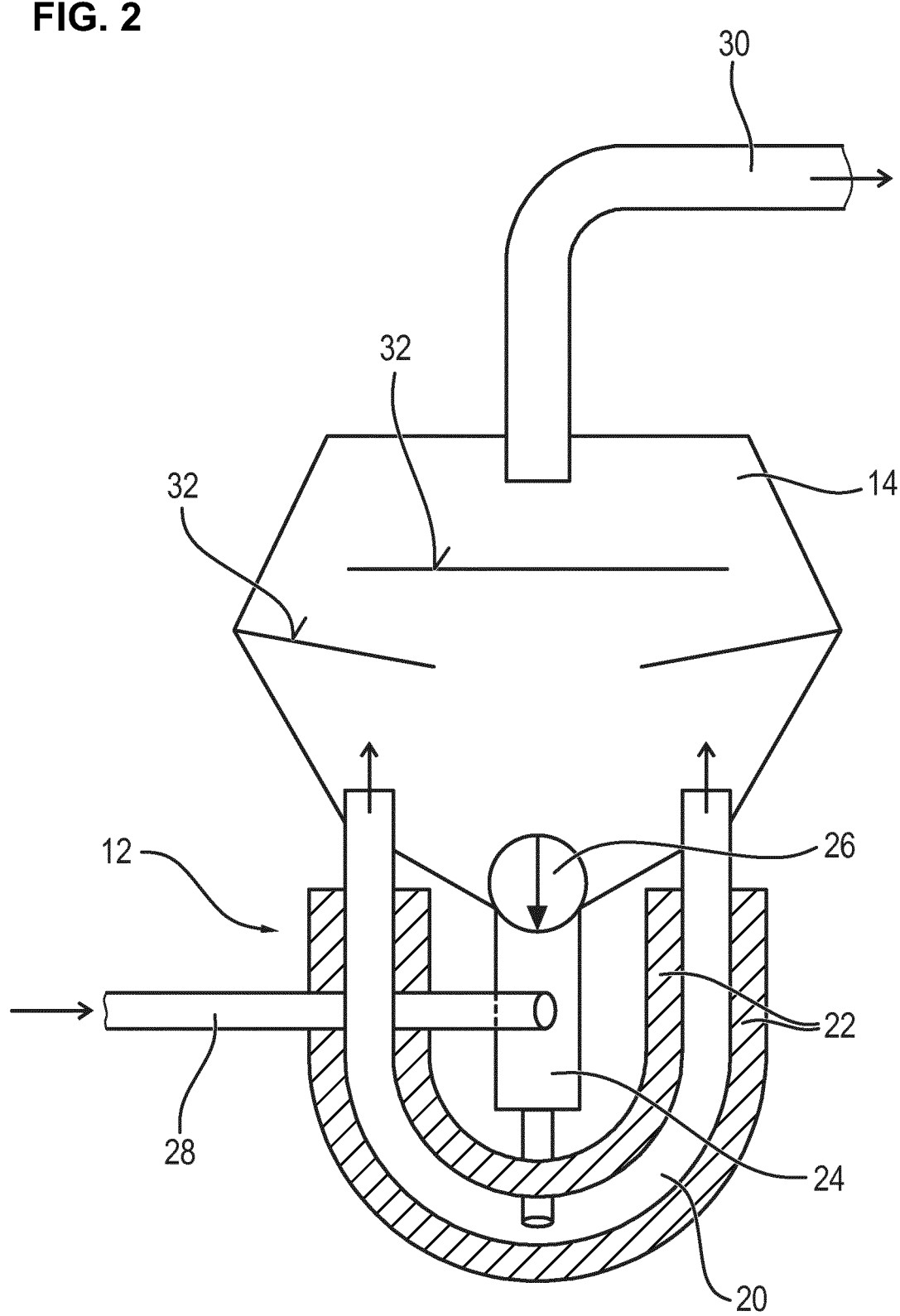
Figure 3:
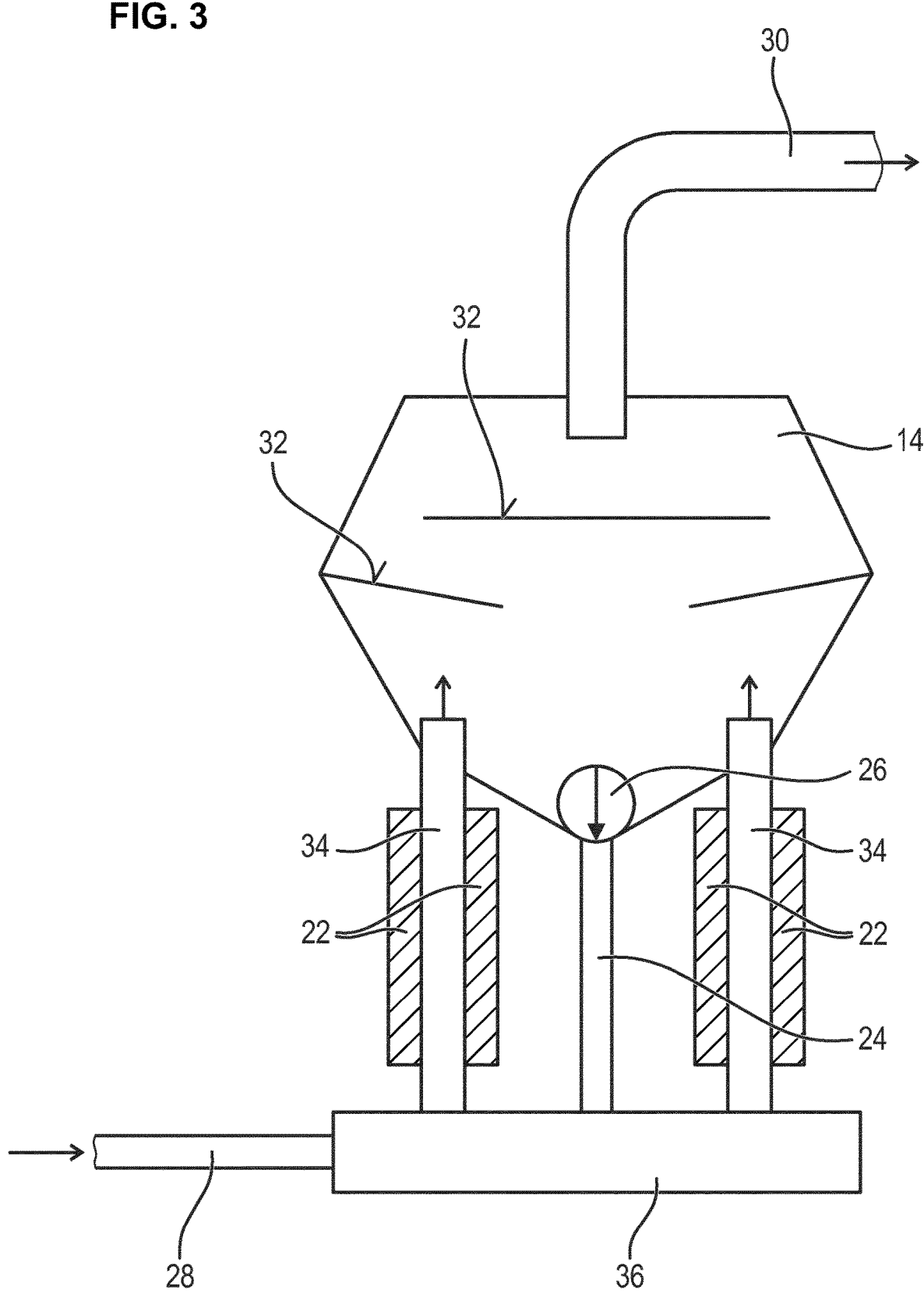

The present invention will be described in further detail with reference to the drawings, in which FIG. 1 illustrates a schematic layout of a steam cooking appliance according to a preferred embodiment of the present invention, FIG. 2 illustrates a schematic layout of a steam system according to a first embodiment of the present invention, and FIG. 3 illustrates a schematic layout of a steam system according to a second embodiment of the present invention.

FIG. 1 illustrates a schematic layout of a steam oven according to a preferred embodiment of the present invention. The steam oven comprises an oven cavity 10, a steam generator 12, a precipitator 14, a water reservoir 16 and a water pump 18.

The oven cavity 10 is provided for receiving and heating up foodstuff. The steam generator 12 is provided for generating steam by heating up water. The water reservoir 16 stores water for the steam generator 12. The water pump 18 is provided for delivering water from the water reservoir 16 to the steam generator 12. The precipitator 14 is provided for separating water droplets from the steam.

An outlet of the water reservoir 16 is connected to an inlet of the water pump 18. An outlet of the water pump 18 is connected to an inlet of the steam generator 12. At least two outlets of the steam generator 12 are connected to at least two corresponding inlets of the precipitator 14. A return line is interconnected between the precipitator 14 and the steam generator 12. An outlet of the precipitator 14 is connected to an inlet of the oven cavity 10.

Instead of the water pump 18, the water reservoir 16 may be arranged sufficiently above the steam generator 12, so that the water is delivered from the water reservoir 16 to the steam generator 12 by gravity.

FIG. 2 illustrates a schematic layout of a steam system according to a first embodiment of the present invention. The steam system includes the steam generator 12 and the precipitator 14. The precipitator 14 is arranged above the steam generator 12.

The steam generator 12 comprises a U-shaped heating pipe 20 and a heating element 22. The heating element 22 encloses the heating pipe 20. The precipitator 14 is formed as a hollow housing. A number of impact surfaces 32 are arranged inside the precipitator 14. Both upper open ends of the U-shaped heating pipe 20 are connected to a bottom side of the precipitator 14. A lower bent portion of the U-shaped heating pipe 20 is connected to the bottom side of the precipitator 14 via a return pipe 24. A one-way valve 26 is interconnected between the bottom side of the precipitator 14 and the return pipe 24. The one-way valve 26 allows only the flow through the return pipe 24 from the precipitator 14 to the lower bent portion of the U-shaped heating pipe 20.

Further, the steam system comprises an inlet pipe 28 and an outlet pipe 30. One end of the inlet pipe 28 is connected to the return pipe 24. Thus, the inlet pipe 28 is connected to the lower bent portion of the U-shaped heating pipe 20 via the return pipe 24. Another end of the inlet pipe 28 is connected or connectable to the water reservoir 16 or the water pump 18. One end of the outlet pipe 30 is connected to a top side precipitator 14. Another end of the outlet pipe 30 is connected or connectable to the oven cavity 10.

The water from the water reservoir 16 and/or water pump 18 is inserted into the lower bent portion of the U-shaped heating pipe 20. Then, the water in the heating pipe 20 is heated up by the heating elements 22. Steam is generated in the heating pipe 20 and rises up into the precipitator 14. Water droplets occurring in the steam bounce against the impact surfaces 32. The resulting water flows down inside the precipitator 14 and through the one-way valve 26 and return pipe 24 into the lower bent portion of the U-shaped heating pipe 20 again. The steam in the precipitator 14 exhausts through the outlet 30 into the oven cavity 10.

FIG. 3 illustrates a schematic layout of a steam system according to a second embodiment of the present invention. The system includes the steam generator 12 and the precipitator 14. The precipitator 14 is arranged above the steam generator 12.

The steam generator 12 comprises two vertical straight heating pipes 34. The vertical straight heating pipe 34 is enclosed by the heating element 22 in each case. The precipitator 14 is formed as the hollow housing. The number of impact surfaces 32 is arranged inside the precipitator 14. The upper open ends of the vertical straight heating pipes 34 are connected to the bottom side of the precipitator 14. The lower ends of the vertical straight heating pipes 34 are connected to a transverse pipe 36. The bottom side of the precipitator 14 is connected to the transverse pipe 36 via the return pipe 24. The one-way valve 26 is interconnected between the bottom side of the precipitator 14 and the return pipe 24. The one-way valve 26 allows only the flow through the return pipe 24 from the precipitator 14 to the lower bent portion of the U-shaped heating pipe 20.

Further, the steam system comprises the inlet pipe 28 and the outlet pipe 30. One end of the inlet pipe 28 is connected to the transverse pipe 36. Another end of the inlet pipe 28 is connected or connectable to the water reservoir 16 or the water pump 18. The one end of the outlet pipe 30 is connected to the top side precipitator 14. The other end of the outlet pipe 30 is connected or connectable to the oven cavity 10.

The second embodiment in FIG. 3 differs from the first embodiment in FIG. 2 in that the U-shaped heating pipe 20 is replaced by the two vertical straight heating pipes 34 and the transverse pipe 36. In the second embodiment only the vertical straight heating pipes 34 are enclosed by the heating elements 22, while the transverse pipe 36 is not enclosed by any heating element.

The water from the water reservoir 16 and/or water pump 18 is inserted via the transverse pipe 36 into the vertical straight heating pipes 34. Then, the water in the vertical straight heating pipes 34 is heated up by the heating elements 22. Steam is generated in the vertical straight heating pipes 34 and rises up into the precipitator 14. Water droplets occurring in the steam bounce against the impact surfaces 32. The resulting water flows down inside the precipitator 14 and through the one-way valve 26 and return pipe 24 into the transverse pipe 36 again. The steam in the precipitator 14 exhausts through the outlet 30 into the oven cavity 10.

The U-shaped heating pipe 20 and the both vertical straight heating pipes 34 provide two exits from the steam generator 12 to the precipitator 14. Said two exits reduce the amount of airborne water droplets from the beginning. Further, the impact surfaces 32 in the precipitator 14 allow the almost complete separation of the remaining water droplets.

The one-way valve 26 forces the water flow to pass through the U-shaped heating pipe 20 or the vertical straight heating pipes 34, respectively. This ensures a thorough cleaning of the U-shaped heating pipe 20 and the vertical straight heating pipes 34. For example, the one-way valve 26 may be formed by a simple floating ball, which acts on a calibrated hole. The same effect may be obtained by calibrating a section of the return pipe 24, so that the substantial part of the water flow passes through the U-shaped heating pipe 20 or the vertical straight heating pipes 34.

Although an illustrative embodiment of the present invention has been described herein with reference to the accompanying drawings, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 oven cavity
12 steam generator
14 precipitator
16 water reservoir
18 water pump
20 U-shaped heating pipe
22 heating element
24 return pipe
26 one-way valve
28 inlet pipe
30 outlet pipe
32 impact surface
34 vertical straight heating pipe
36 horizontal pipe

The invention claimed is:

1. A steam cooking appliance comprising a steam system and an oven cavity, wherein:
the steam system includes a steam generator and a precipitator, the precipitator is arranged above the steam generator, the steam generator comprises two vertical heating pipe sections, upper ends of the heating pipe sections are connected to a bottom side of the precipitator, lower ends of the heating pipe sections are connected by a transverse pipe section, at least the heating pipe sections are at least partially enclosed by one or more heating elements, an inlet pipe is connected to the transverse pipe section at one end and connected or connectable to a water reservoir or water pump at another end, and a return pipe is interconnected between the bottom side of the precipitator and the transverse pipe section,
wherein the oven cavity is configured to receive steam produced by the steam system.

2. The steam cooking appliance according to claim 1, wherein a one-way valve is interconnected between the bottom side of the precipitator and the return pipe.

3. The steam cooking appliance according to claim 1, wherein an outlet pipe is connected to a top side of the precipitator at one end and connected or connectable to the oven cavity at another end.

4. The steam cooking appliance according to claim 1, wherein the precipitator is formed as a housing and comprises a number of impacted surfaces inside said housing.

5. The steam cooking appliance according to claim 1, wherein the transverse pipe section is bent such that the transverse pipe section and the two vertical heating pipe sections form a U-shaped heating pipe.

6. The steam cooking appliance according to claim 5, wherein the transverse pipe section portion of the U-shaped heating pipe is at least partially enclosed by one or more heating elements.

7. The steam cooking appliance according to claim 5, wherein the U-shaped heating pipe is completely enclosed by one or more heating elements.

8. The steam cooking appliance according to claim 5, wherein the return pipe and the inlet pipe comprise a common pipe section connected to the lower bent portion of the U-shaped heating pipe.

9. The steam cooking appliance according to claim 2, wherein the one-way valve comprises a floating ball and a calibrated hole, wherein the floating ball acts on the calibrated hole.

10. The steam cooking appliance according to claim 1, further comprising a water reservoir, said steam system being interconnected between the water reservoir and oven cavity.

11. The steam cooking appliance according to claim 10, wherein the steam cooking appliance includes a water pump interconnected between the water reservoir and the steam system.

12. A steam system for a steam cooking appliance, comprising:
a water reservoir for storing water;
an oven cavity;
and a steam-generator assembly separate from the water reservoir and interconnected between the water reservoir and the oven cavity, the steam-generator assembly including a steam generator and a precipitator;
the steam generator comprising:
a heating pipe having a heating-pipe inlet and a heating-pipe outlet, said heating-pipe inlet being in fluid communication with the water reservoir for receiving water therefrom;
a heating element to heat water in the heating pipe to convert at least a portion of said water therein to steam; and
the precipitator comprising:
a precipitator inlet in fluid communication with said heating-pipe outlet for receiving a mixture of water and steam therefrom, said precipitator being configured to separate steam and water from said mixture;
a first precipitator outlet in fluid communication with the oven cavity for delivering separated steam thereto; and
a second precipitator outlet in fluid communication with a location upstream of said heating-pipe inlet for recirculating separated water thereto;
wherein the water from said water reservoir flows first to said steam generator via said heating-pipe inlet, and thereafter to said precipitator as said mixture via said heating-pipe outlet.

13. The steam system of claim 12, wherein the water reservoir is arranged above the steam generator such that water flows from the water reservoir to said heating-pipe inlet via gravity.

14. The steam system of claim 12, wherein the precipitator is arranged above said steam generator such that the mixture of water and steam generated in said heating pipe rises up through said heating pipe and proceeds from said heating-pipe outlet to said precipitator inlet.

15. The steam system of claim 12, wherein the precipitator is arranged above said location upstream of said heating-pipe inlet such that water is delivered from said precipitator to said location via gravity.

16. The steam system of claim 15, further comprising a return pipe interconnected between said precipitator and said steam generator for delivering water from said second precipitator outlet to said location upstream of said heating-pipe inlet.

17. The steam system of claim 12, further comprising: an outlet pipe interconnected between said precipitator and said oven cavity for delivering steam from said first precipitator outlet to said oven cavity.

18. The steam system of claim 16, further comprising at inlet pipe interconnected between the water reservoir and the steam-generator assembly for delivering water from the water reservoir to the steam generator.

19. The steam system of claim 18, wherein the inlet pipe and return pipe are connected at said location upstream of said heating-pipe inlet.

* * * * *